June 5, 1928.                    R. S. LEWIS                    1,672,131
                                   WHEEL
                              Filed Dec. 1, 1926
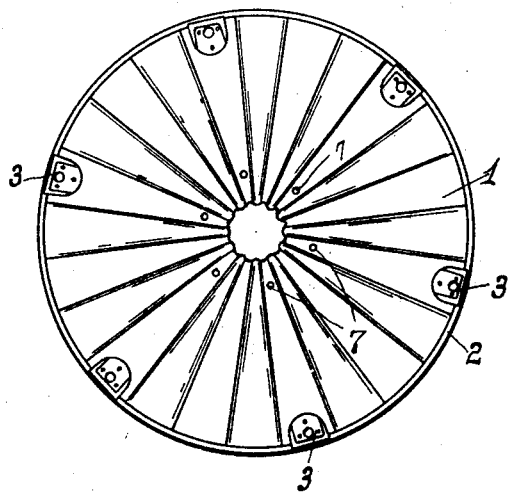
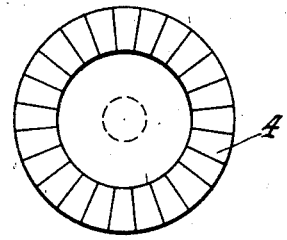
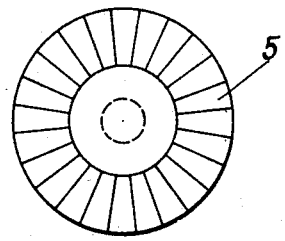
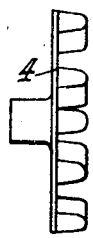
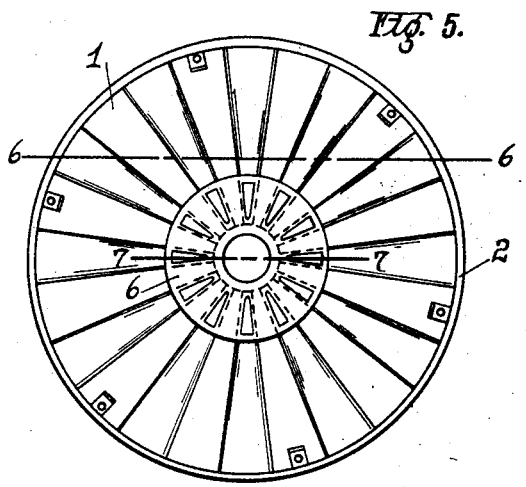
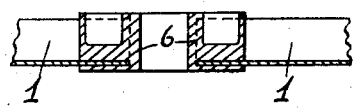
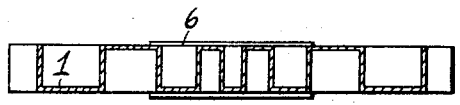
Inventor
Ralph S. Lewis.
By Harry C. Schroeder
Attorney Patented June 5, 1928.

1,672,131

UNITED STATES PATENT OFFICE.

RALPH S. LEWIS, OF BEVERLY HILLS, CALIFORNIA.

WHEEL.

Refile of abandoned application Serial No. 367,593, filed March 22, 1920. This application filed December 1, 1926. Serial No. 152,046.

The present application is a refile of the applicant's abandoned application, Serial No. 367,593.

The object of my improved steel wheel is to obtain a lighter and stronger wheel which may be inexpensively and easily constructed.

A corrugated steel wheel is naturally quite heavy, the hub portion being a large item in increasing that weight. By casting the hub it becomes a component part of the wheel, has less material in it, and obviates some machine work, the only machining being the axle hole. Reinforcing the hub with the corrugations of the wheel makes a very compact and strong construction.

Referring to the drawing:

Figure 1 is a side view of my steel wheel before the hub is cast into it.

Figure 2 is a plan view of one half of the hub pattern.

Figure 3 is a plan view of the other half of the hub pattern.

Figure 4 is a side view of one half of the hub pattern.

Figure 5 is a rear view of my complete wheel.

Figure 6 is a section taken on the line 6—6 of Figure 5.

Figure 7 is a section taken on the line 7—7 of Figure 5.

Referring to the drawings in detail:

A corrugated steel wheel 1 is made of sheet metal having segmental portions of trough-shaped cross sections. The side walls of each segmental portion is perpendicular to the connecting wall. The rim 2 is welded to the light wheel 1. On account of the welded joint, reinforcing blocks 3 are necessary for reinforcing the rim 2 and giving a body for tire bolts, not shown. The reinforcing blocks 3 are secured to the wheel 1 in any conventional manner.

The wheel 1 is stamped to retain the perforated form heretofore described. The corrugations on the wheel extend from the rim to a place quite close to the axle hole in the center thereof.

Patterns 4 and 5 are then placed over the wheel and a hub 6 is cast thereon, becoming an integral part of the wheel. When the hub 6 is cast, the metal flows together thru holes 7, thereby forming a solid hub on the wheel 1. The fact that the corrugations extend quite close to the hub area assures a large gripping surface for the hub, thereby providing a perfect solid hub at the center of the wheel disk.

I claim:

A corrugated steel wheel including a hub, a web, and a rim, the web being formed of sheet metal having segmental portions of trough shaped cross section, the side walls of each segmental portion being perpendicular to their connecting wall, the web being provided with perforations in its hub area, the hub being cast in the center of the web and projecting through said perforations and having both of its outer side faces in planes parallel to each other and means whereby the web is secured to the rim.

In testimony whereof I affix my signature.

RALPH S. LEWIS.